United States Patent [19]
Deitrich et al.

[11] Patent Number: 5,568,813
[45] Date of Patent: Oct. 29, 1996

[54] METHOD FOR COMBINING ULTRASOUND VECTOR DATA FROM MULTIPLE FIRINGS TO IMPROVE IMAGE QUALITY

[75] Inventors: Thomas L. Deitrich, Durham, N.C.; Rowland F. Saunders, Hartland, Wis.

[73] Assignee: General Electric Company, Milwaukee, Wis.

[21] Appl. No.: 344,054

[22] Filed: Nov. 23, 1994

[51] Int. Cl.$^6$ .................................................. A61B 8/00
[52] U.S. Cl. ..................................................... 128/661.01
[58] Field of Search ...................... 128/660.05, 660.07, 128/660.08, 661.01; 73/624, 625, 626, 628, 641

[56] References Cited

U.S. PATENT DOCUMENTS

| | | | |
|---|---|---|---|
| 4,699,009 | 10/1987 | Maslak et al. | 73/626 |
| 5,462,057 | 10/1995 | Hunt et al. | 128/661.01 |

*Primary Examiner*—George Manuel
*Attorney, Agent, or Firm*—Dennis M. Flaherty; John H. Pilarski

[57] ABSTRACT

An ultrasound imaging system is provided with a vector compounder and a vector splicer for respectively compounding and splicing vector data from multiple firings along a scan line to improve image quality. The compounder consists of an accumulator which sums the vector data of at least two vector data sets and then scales the summed vector data by a scaling factor. Preferably, the scaling factor equals 1/n, where n is the number of vector data sets being summed. The splicer splices compounded vector data to form a single output vector data set in accordance with a weighting function that splices vector data from a first compounded vector data set for a firing having a first range of maximum focus and vector data from a second compounded vector data set for a firing having a second range of maximum focus with a transition region therebetween. The vector data from the first and second compounded vector data sets are combined in the transition region using a piecewise linear weighting function. The piecewise linear weighting function uses a first set of weighting factors which increase linearly in magnitude from a number less than 1.0 to 1.0 and a second set of weighting factors which decrease linearly in magnitude from 1.0 to a number less than 1.0, the weighting factors of the first and second sets forming pairs of weighting factors having magnitudes the sum of which equals 1.0.

17 Claims, 5 Drawing Sheets

METHOD FOR COMBINING ULTRASOUND VECTOR DATA FROM MULTIPLE FIRINGS TO IMPROVE IMAGE QUALITY

FIELD OF THE INVENTION

This invention generally relates to ultrasound imaging of human tissue and blood. In particular, the invention relates to a method for improving image quality by combining vector data from multiple firings.

BACKGROUND OF THE INVENTION

Conventional ultrasound imaging systems comprise an array of ultrasonic transducers which are used to transmit an ultrasound beam and then receive the reflected beam from the object being studied. For ultrasound imaging, the array typically has a multiplicity of transducers arranged in a line and driven with separate voltages. By selecting the time delay (or phase) and amplitude of the applied voltages, the individual transducers can be controlled to produce ultrasonic waves which combine to form a net ultrasonic wave that travels along a preferred vector direction and is focussed at a selected point along the beam. Multiple firings may be used to acquire data representing the same anatomical information. The beamforming parameters of each of the firings may be varied to provide a change in maximum focus or otherwise change the content of the received data for each firing, e.g., by transmitting successive beams along the same scan line with the focal point of each beam being shifted relative to the focal point of the previous beam. By changing the time delay and amplitude of the applied voltages, the beam with its focal point can be moved in a plane to scan the object.

The same principles apply when the transducer is employed to receive the reflected sound (receiver mode). The voltages produced at the receiving transducers are summed so that the net signal is indicative of the ultrasound reflected from a single focal point in the object. As with the transmission mode, this focussed reception of the ultrasonic energy is achieved by imparting separate time delays (and/or phase shifts) and gains to the signal from each receiving transducer.

FIG. 1 depicts an ultrasound imaging system consisting of four main subsystems: a beamformer 2, processors 4 (including a separate processor for each different mode), a scan converter/display controller 6 and a kernel 8. System control is centered in the kernel, which accepts operator inputs through an operator interface 10 and in turn controls the various subsystems. The master controller 12 performs system level control functions. It accepts inputs from the operator via the operator interface 10 as well as system status changes (e.g., mode changes) and makes appropriate system changes either directly or via the scan controller. The system control bus 14 provides the interface from the master controller to the subsystems. The scan control sequencer 16 provides real-time (acoustic vector rate) control inputs to the beamformer 2, system timing generator 24, processors 4 and scan converter 6. The scan control sequencer 16 is programmed by the host with the vector sequences and synchronization options for acoustic frame acquisitions. The scan sequencer broadcasts the vector parameters defined by the host to the subsystems via scan control bus 18.

The main data path begins with the analog RF inputs to the beamformer 2 from the transducer 20. The beamformer 2 outputs two summed digital baseband I,Q receive beams. The I,Q data is input to a processor 4, where it is processed according to the acquisition mode and output as processed vector (beam) data to the scan converter/display processor 6. The scan converter accepts the processed vector data and outputs the video display signals for the image to a color monitor 22.

The B/M mode processor converts the left/right sets of baseband I and Q data from the beamformer into logcompressed versions of the left/right signal envelopes. The B function images the time-varying amplitude of the envelope of the signal as a grey scale. The envelope of a baseband signal is the magnitude of the vector which I and Q represent.

Ultrasound imaging suffers from the inherent imaging artifact referred to as speckle. Speckle is the mottling found in the images produced from interference patterns of multiple receive echoes. This mottling is primarily caused by the null in the acoustic interference pattern, but other anomalies in the image, e.g., random electronic noise, can cause mottling. The acoustic nulls are accentuated by the log compression required to display the full dynamic range of the ultrasound image. These nulls appear as black holes in the image. It is desirable to minimize speckle to improve image quality.

SUMMARY OF THE INVENTION

In accordance with the technique of the present invention, the received data from each of the firings is combined to provide a single output vector of data. The vector output data is used in forming the image displayed on the system.

The data for each of the receive firings consists of a time-varying amplitude representing the return signal strength from the scanned anatomy. In accordance with the present invention, the output vector of data is a function of the available vector data from any or all of the firings. For example, the input vector data for multiple firings can be combined to take advantage of the best range(s) of data from each receive firing. Input vector data for multiple firings is summed to form the output vector data using weighting factors in accordance with the following formula:

$$\text{Output}(t, n+1, p) = \sum_{0}^{n} W_n \times \text{Input}(t, n, p)$$

where t is the time or range position in the vector; n is the firing number of the current input data set; p is the position of the vector in the image; Input(t, n, p) is the amplitude of the n-th firing at time t and position p; Output(t, n+1, p) is the result of the calculations after n vectors have been processed; and $W_n$ are weighting factors which can be a function of one or more of the following: t, n, p, Input(t, n, p) and Output(t, n, p). The position in the signal processing chain for this function is after the beamformer output and prior to the scan conversion function, i.e., inside the B/M mode processor.

In accordance with a first preferred embodiment of the invention, a constant weighting of each of the firings is used. In this case each firing is assigned a constant weight approximately equal to 1/n. The weighting used would be independent of firing number and position in the image. This variation (hereinafter referred to as "vector compounding") is used to combine firings with different focal zones in certain cases in B mode.

In accordance with a second preferred embodiment of the invention, a piecewise linear weighting function (hereinafter referred to as "splicing") is used. In this case each firing receives a weighting of 1.0 for a range of data. The weighting equals 0 for the other firings in this range. The image speckle is slightly different from firing to firing. For this reason, a linear change in the weighting is used to provide a smooth transition between data of adjacent firings. The start and stop of the transition point between firings is varied as a function of the position in the image to provide a pseudo random pattern that minimizes the visibility of splices between data sets.

DETAILED DESCRIPTION OF THE PREFERRED EMBODIMENT

Figure 1:
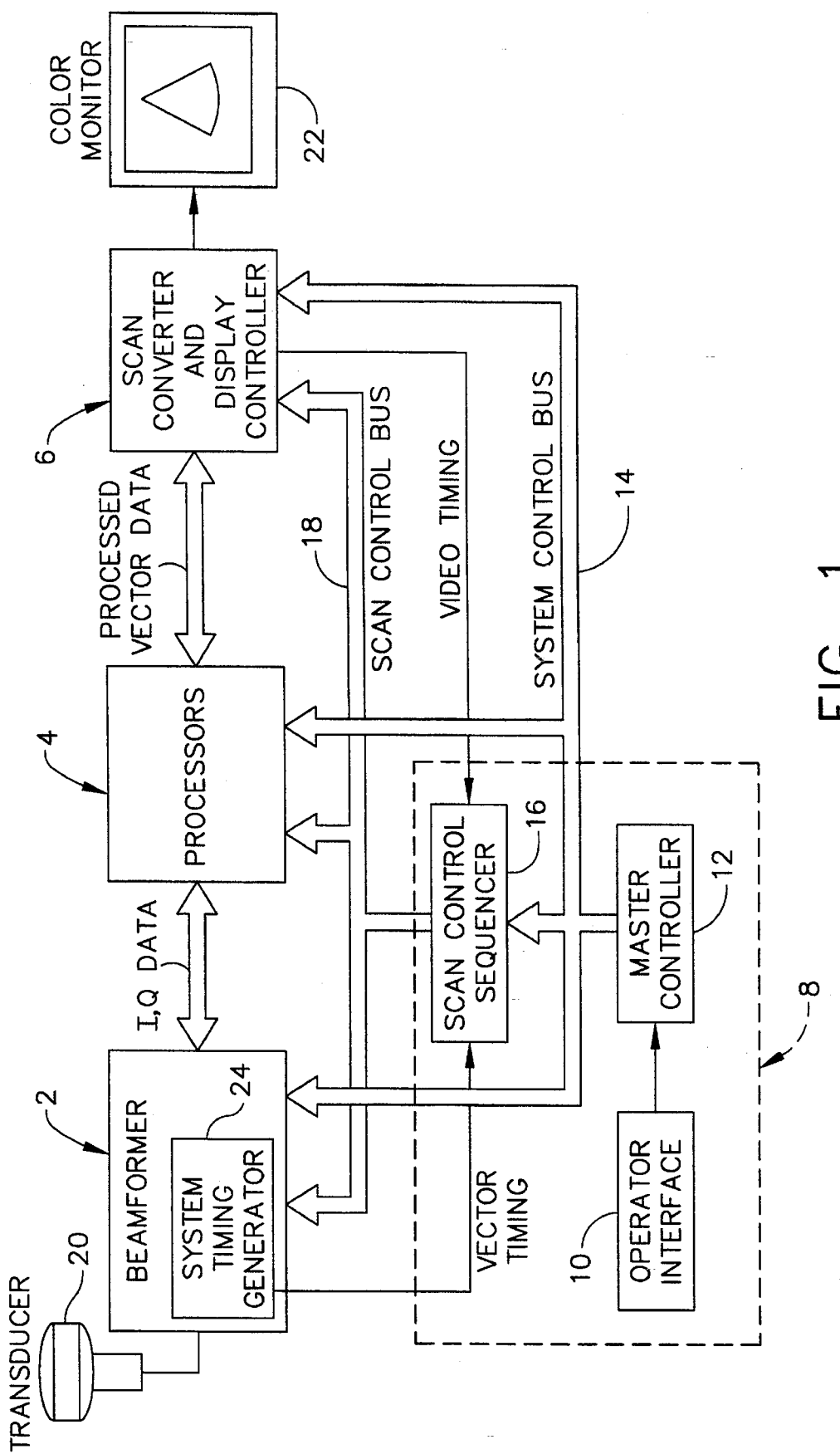
FIG. 1 is a block diagram showing the major functional subsystems within a real-time ultrasound imaging system.
Figure 2:
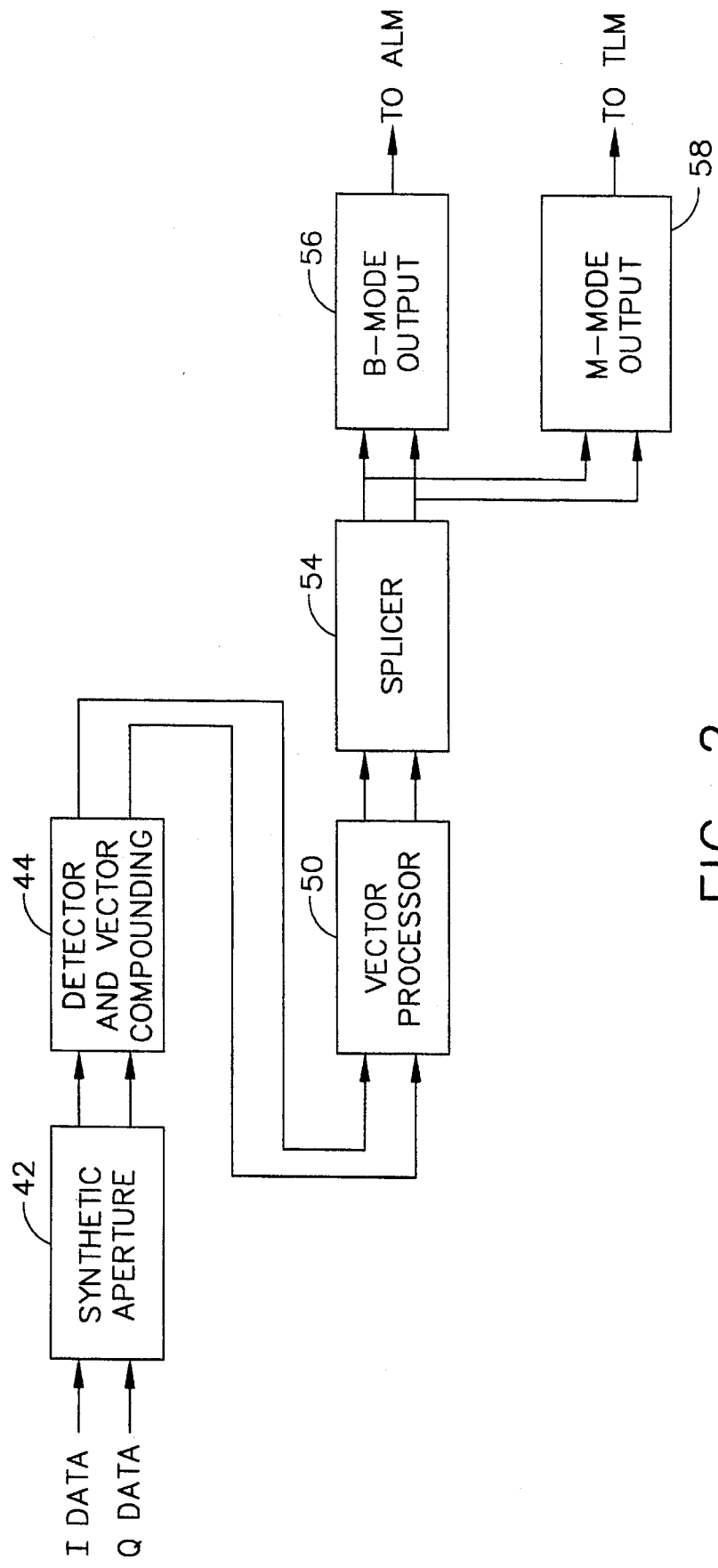
FIG. 2 is a block diagram of a B/M mode processor in accordance with the preferred embodiment of the invention.

The present invention is incorporated in the B/M mode processor depicted in FIG. 2. That processor comprises a synthetic aperture 42 which accumulates I/Q data sets (vectors) and outputs a resultant I/Q vector that is an appropriately scaled version of the sum. The synthetic aperture 42 is controlled via two tags delivered by the scan control bus interface 62. One tag indicates that accumulation should occur. The other tag signifies that in addition to the accumulation, the result should be appropriately scaled and output from the block. Furthermore, only those vectors of type B or M will be processed; all others will be ignored at the input (and not passed to the remainder of the circuit board). A signal from the scan control bus interface block 62 will inform the synthetic aperture block 42 of the incoming vector type. The left and right data sets are time-multiplexed on the I and Q buses, alternating left/right with every point.

The synthetic aperture output is input to the detector and vector compounding block 44. The detector will rectify I/Q pairs output from the synthetic aperture block 42 into a magnitude value (corresponding to the envelope of the baseband signal) to be used by the remainder of the circuit board. The detector used is a $(I^2+Q^2)^{1/2}$ detector. There are two sets (left and right) of I and Q into the detector, and two envelope outputs from the detector. The left and right data pipes will employ time-multiplexing as previously described.

The vector compounder will accumulate magnitude data sets (vectors) and output a resultant magnitude vector that is an appropriately scaled version of the sum. The vector compounder is controlled via two tags COMP_ON and COMP_LAST (see FIG. 3) delivered by the scan control bus interface 62. COMP_ON indicates that accumulation should occur, COMP_LAST (and COMP_ON) signifies that in addition to the accumulation, the result should be appropriately scaled and output from the block. The compounder demultiplexes the left and right data pipes and outputs the two to a vector processor 50, which performs processing functions such as filtering and edge enhancement. Non-valid data out of block 44 will be zero, such that vectors into the vector processor 50 will be windowed by a rectangular function.

The system may be operated in a B or M mode with multiple different transmit/receive vector data sets corresponding to a single firing angle or position. Each of these data sets will be formed with a different transmit focus. The purpose of this is to maximize the resolution in the image by taking the highest resolution sections of each of the data sets. The gain and transmit power from each of these data sets is maintained in such a way as to minimize the amplitude variations in the regions of the data sets where a splice is to be performed.

The splicer block 54 primarily extracts the desired data sections from incoming vectors. During the multi-transmit mode the splicer block also provides a staggering in the extraction position between vectors and a mixing of old and new vectors in the transitions. This mixing in the transition region prevents ridges in the scanned image that might otherwise have resulted from butt splicing the firings together.

The B-mode output block 56 collects vector data and tags it for delivery to the acoustic line memory and cine boards (not shown). B-mode output block 56 forms complete output vector(s) from one or multiple input vectors (multi-transmit focus). The vector tags are used to form the control bytes in the output vector.

Figure 3:
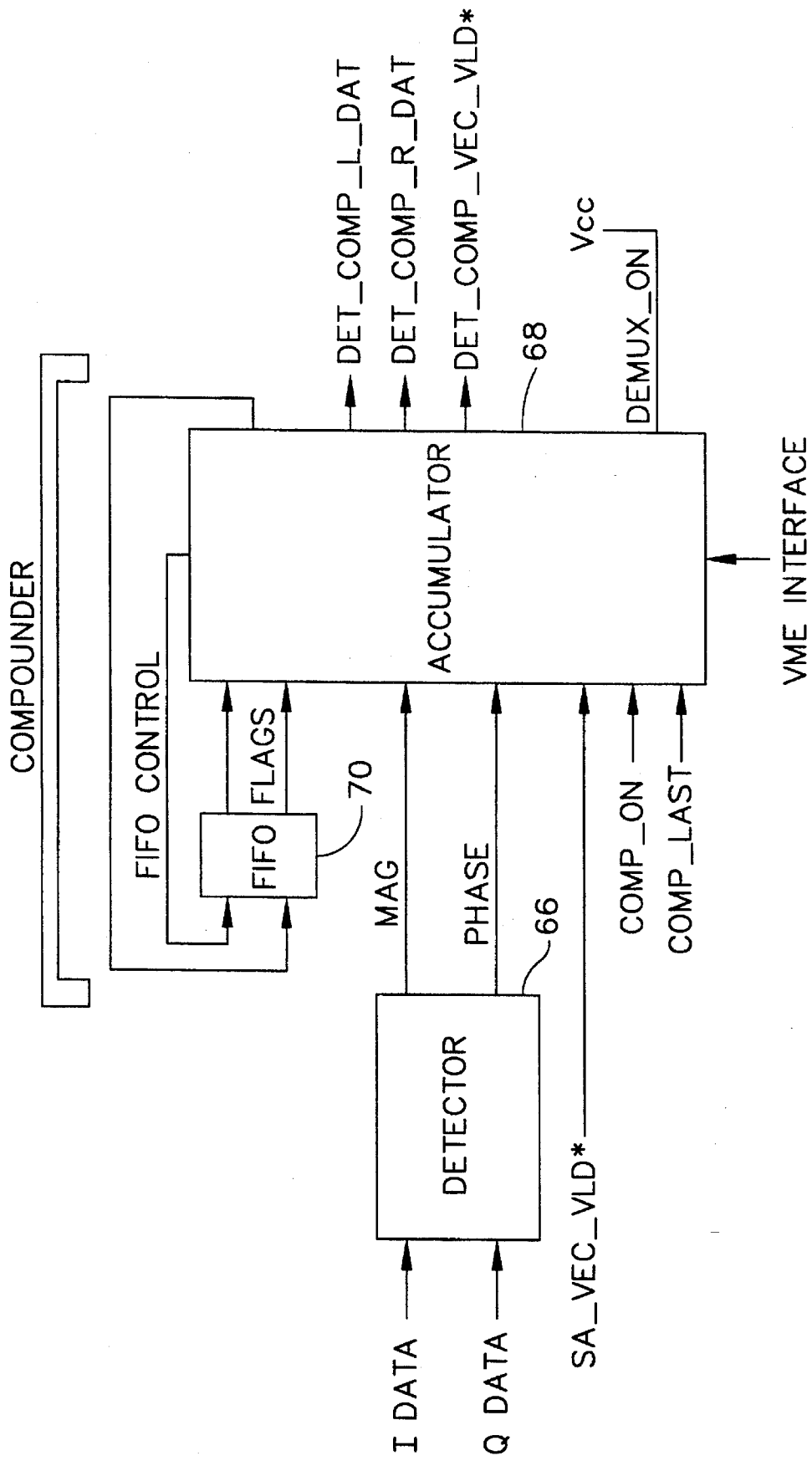
FIG. 3 is a block diagram of the detector and vector compounder incorporated in the B/M mode processor shown in FIG. 2.

The detector-vector compounder block 44 is shown in detail in FIG. 3. Input data must be accompanied by the active-low vector valid signal, SA_VEC_VLD*, out of the synthetic aperture block 42. DET_COMP_VEC_VLD* is the active-low vector valid signal out of the detector-compounder block. This will accompany all data output from the block 44. Non-valid data out of the block will be zero.

Compounding (averaging of magnitude vectors) is facilitated by an accumulator 68. If COMP_ON is set to 1, then the accumulator will add the next vector to the vector currently stored in FIFO 70, and this sum will be stored in the FIFO. Up to four vectors may be compounded. If, in addition to COMP_ON, COMP_LAST is also 1, then the next vector is accumulated as before, scaled and finally output as DET_COMP_L_DAT and DET_COMP_R_DAT, accompanied by DET_COMP_VEC_VLD*.

In accordance with the preferred embodiment, the scaling is done as follows: if two vectors are accumulated, divide by two; if three or four vectors are accumulated, divide by 4. Although from a performance standpoint it would be better to divide three accumulated vectors by three, division by four reduces the cost of the hardware because it can be accomplished simply by changing two bits, thereby avoiding the need for a multiplier.

Figure 4:
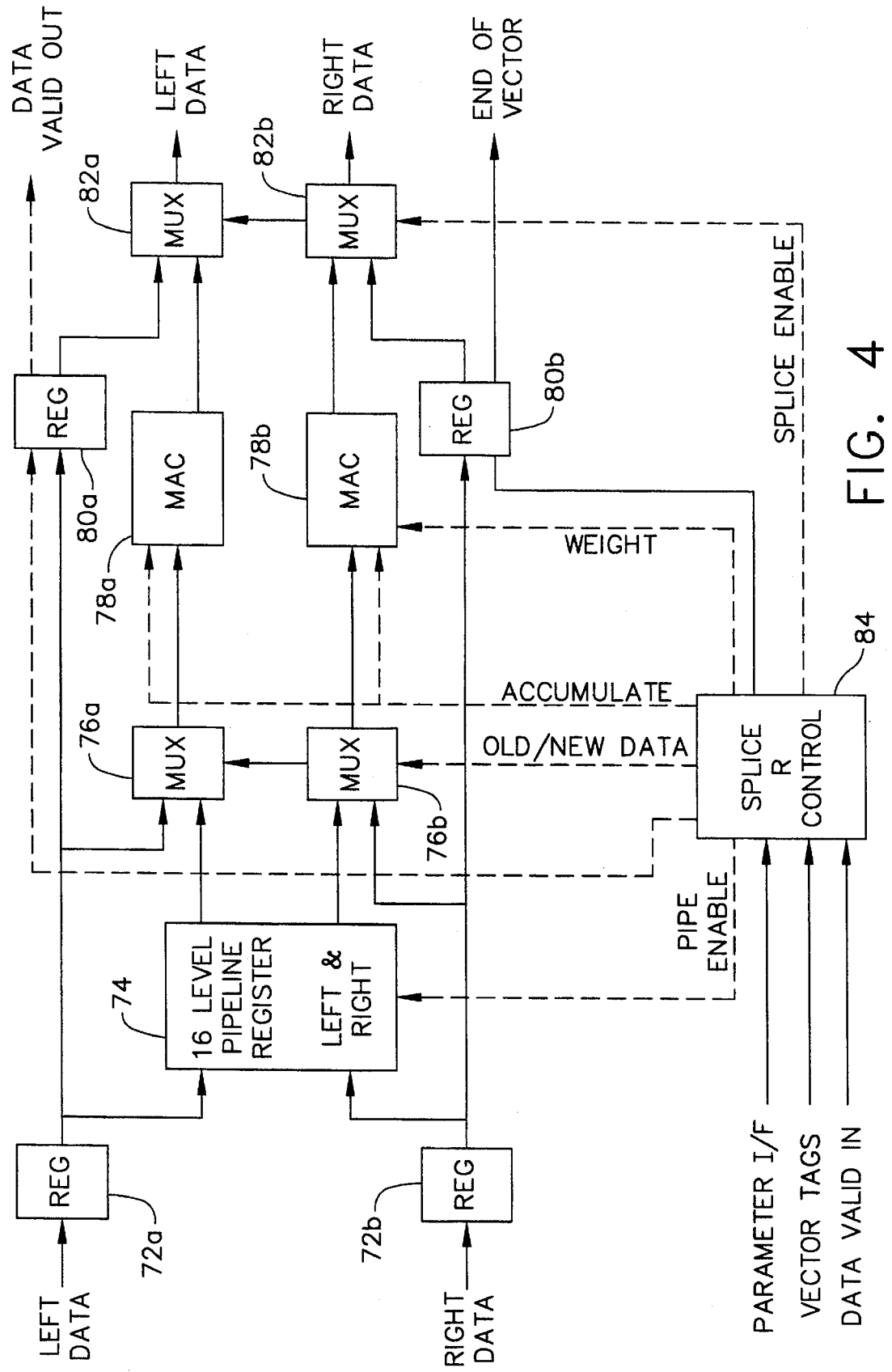
FIG. 4 is a block diagram of the splicer incorporated in the B/M mode processor shown in FIG. 2.

The architecture of the splicer in accordance with the present invention is shown in FIG. 4. Before any vectors arrive, the splicer is initialized by parameter storage and scan bus interface blocks (not shown). The parameter storage block loads a programmable gate array in the splicer control block 84 with the start and stop points, the fade region, the start/stop offset and also the multi-transmit enable. The scan bus interface provides the vector tags for BM_Function and firing number.

In the non-multi-transmit mode, the vector data bypasses the multiplier-accumulators (MACs) 78a and 78b The LEFT DATA is transferred to the multiplexer 82a via registers 72a and 80a connected in series; the RIGHT DATA is transferred to the multiplexer 82b via registers 72b and 80b connected in series. The Data Valid In signal enables a counter which controls the Data Valid Out signal. When the counter value is between the start and stop point Data Valid Out is true. This mode does not use the start/stop offset or the fade region parameters. Only firing number 0 vectors are allowed in this mode.

In the multi-transmit mode, a piecewise linear weighting function (shown in FIG. 5) is used to splice ranges of data from different input vectors to form the output vector. In this case each firing receives a weighting of 1.0 for a range of data. The weighting equals 0 for the other firings in this range. The image speckle is slightly different from firing to firing. For this reason, a linear change in the weighting is used to provide a smooth transition between data of adjacent firings. The start and stop of the transition point between firings is varied as a function of the position in the image to provide a pseudo random pattern that minimizes the visibility of splices between data sets.

Referring to FIG. 4, LEFT DATA vector data sets are output in succession from register 72a to the multiplexer 76a and to the 16-level pipeline register 74. For ease of discussion, a first vector data set will be referred to hereinafter as "old data" and a second vector data set will be referred to hereinafter as "new data". The old and new data are combined in accordance with FIG. 5 to form the output vector data set. Before the start point of the transition region of the output vector data set, the old data is passed through multiplexer 76a unchanged and is multiplied by a weight of 1.0 in MAC 78a. Similarly, after the stop point of the transition region of the output data, the new data is passed through multiplexer 76a unchanged and is multiplied by a weight of 1.0 in MAC 78a. Between the start and stop points of the transition region, the multiplexer 76a toggles between the old and new data, producing two values for each range, which pairs of values are multiplied by respective weights in MAC 78a and then accumulated to form an amplitude for the same range of the output vector. The RIGHT DATA is spliced in a similar fashion pipeline register 74, multiplexer 76b and MAC 78b.

Figure 5:
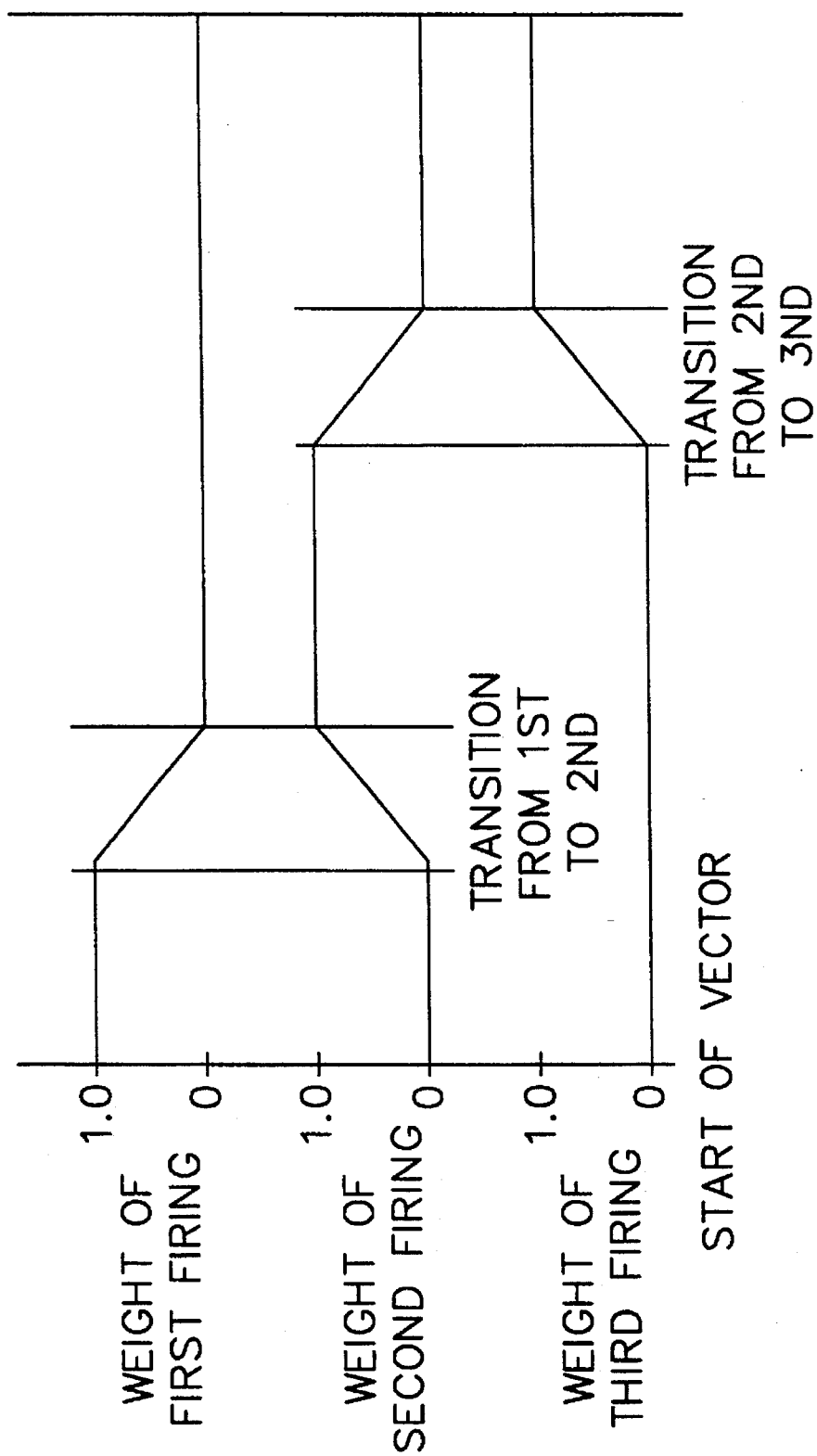
FIG. 5 is a schematic diagram of a piecewise linear weighting function for combining firings with different focal zones in accordance with a preferred embodiment of the invention.

In the multi-transmit mode, the Data Valid In signal enables a counter, although the count value is now compared to the start/stop values plus an offset. When the count value is within this region, the Data Valid Out is true. The parameter storage loads four offsets for each vector and the count from one of four BM_Function-enabled 2-bit counters in the splicer control 84 selects the active offset. These 2-bit counters are incremented when the firing number is 0, thus providing the vector stagger functionality. The splicer control 84, after reaching the stop count, enables the pipeline register 74 to load the next 16 pixels. A portion of these pixels defined by a Fade value will be combined with the beginning of the next vector. The Fade value defines the size of the transition region between one focal zone vector and another. The pixels from the previous vector are weighted with a linearly decreasing coefficient from 1 and summed to the new pixel data weighted by 1 minus the coefficient, as shown in FIG. 5. The start/stop offset values do not apply to the start point of the first vector or the stop point of the last vector which are to make up a multi-transmit vector. Firing number 0 must always be the last vector in the multi-transmit group. The splicer generates an End of Vector pulse after the stop is reached for firing number 0. When the Last Vector tag is true and the firing number is not zero, then the stagger counters are reset. This maintains the splicer offset position constant relative to the entire image.

The foregoing preferred embodiments have been disclosed for the purpose of illustration. Variations and modifications will be readily apparent to those skilled in the art of ultrasonic imaging systems. All such variations and modifications are intended to be encompassed by the claims set forth hereinafter.

We claim:

1. An ultrasound imaging system comprising:

means for transmitting ultrasound beams along a scan line, wherein said transmitting means transmit a first ultrasound beam having a first range of maximum focus and a second ultrasound beam having a second range of maximum focus different than said first range of maximum focus;

means for transducing received echoes from said ultrasound beams, wherein said transducing means form first and second sets of vector data in response to echoes from said first and second ultrasound beams respectively;

means for splicing vector data derived from said first and second vector data sets to form a single output vector data set in accordance with a weighting function that splices vector data from said first vector data set for said first range of maximum focus and vector data from said second vector data set for said second range of maximum focus with a transition region therebetween, said vector data derived from said first and second vector data sets being combined in said transition region; and means for displaying pixel data corresponding to said single output vector data set, wherein said weighting function is a piecewise linear weighting function.

2. The ultrasound imaging system as defined in claim 1, wherein said splicing means comprises:

means for supplying a first set of weighting factors which increase linearly in magnitude from a number less than 1.0 to 1.0 and a second set of weighting factors which decrease linearly in magnitude from 1.0 to a number less than 1.0, the weighting factors of said first and second sets forming pairs of weighting factors having magnitudes the sum of which equals 1.0;

means for multiplying a respective vector datum from said first vector data set by a respective weighting factor from said first weighting factor set to form a first product and multiplying a respective vector datum from said second vector data set by a respective weighting factor from said second weighting factor set to form a second product; and means for summing said first and second products.

3. The ultrasound imaging system as defined in claim 2, wherein said splicing means further comprises means for outputting a first control signal indicating a start point of said transition region and a second control signal indicating a stop point of said transition region, said multiplying means applying a weighting factor of 1.0 to vector data derived from said first vector data set preceding said start point and said multiplying means applying a weighting factor of 1.0 to vector data derived from said second vector data set subsequent to said stop point.

4. The ultrasound imaging system as defined in claim 1, further comprising means for compounding vector data from at least two vector data sets, wherein said compounding means is connected downstream of said transducing means and upstream of said splicing means.

5. The ultrasound imaging system as defined in claim 4, wherein said transmitting means transmit a third ultrasound beam having said first range of maximum focus and a fourth ultrasound beam having said second range of maximum focus, said transducing means form third and fourth sets of vector data in response to echoes from said third and fourth ultrasound beams respectively means, said compounding means compound said first vector data set with said third vector data set to form a first compounded vector data set and compound said second vector data set with said fourth vector data set to form a second compounded vector data set, and said splicing means splice vector data derived from said first and second compounded vector data sets.

6. The ultrasound imaging system as defined in claim 5, wherein said compounding means comprise means for summing vector data of at least two vector data sets and means for scaling said summed vector data by a scaling factor.

7. The ultrasound imaging system as defined in claim 6, wherein said scaling factor equals 1/n and n is the number of vector data sets being summed.

8. The ultrasound imaging system as defined in claim 6, wherein said scaling factor equals ½ when the number of vector data sets being summed is two and equals ¼ when the number of vector data sets being summed is three or four.

9. An ultrasound imaging system comprising:
   means for transmitting first and second ultrasound beams along a predetermined scan line in succession;
   means for forming first and second vector data sets in response to echoes from said first and second ultrasound beams;
   means for compounding vector data from said first and second vector data sets, wherein said compounding means comprise means for summing vector data of said first and second vector data sets and means for scaling said summed vector data by a scaling factor; and
   means for displaying pixel data derived at least in part from said compounded vector data.

10. The ultrasound imaging system as defined in claim 9, wherein said scaling factor equals 1/n and n is the number of vector data sets being summed.

11. The ultrasound imaging system as defined in claim 9, wherein said scaling factor equals ½ when the number of vector data sets being summed is two and equals ¼ when the number of vector data sets being summed is three or four.

12. A method for ultrasound imaging of vector data derived from first and second firings along a scan line, said first firing having a first range of maximum focus and said second firing having a second range of maximum focus different than said first range of maximum focus, comprising the steps of:
   forming first and second sets of vector data in response to echoes from said first and second firings respectively;
   selecting vector data derived from said first and second vector data sets to form a single output vector data set in accordance with a weighting function that splices vector data from said first vector data set for said first range of maximum focus and vector data from said second vector data set for said second range of maximum focus with a transition region therebetween, said vector data derived from said first and second vector data sets being combined in said transition region; and
   displaying pixel data corresponding to said single output vector data set,
   wherein said weighting function is a piecewise linear weighting function.

13. The method as defined in claim 12, further comprising the steps of:
   supplying a first set of weighting factors which increase linearly in magnitude from a number less than 1.0 to 1.0 and a second set of weighting factors which decrease linearly in magnitude from 1.0 to a number less than 1.0, the weighting factors of said first and second sets forming pairs of weighting factors having magnitudes the sum of which equals 1.0;
   multiplying a respective vector datum from said first vector data set by a respective weighting factor from said first weighting factor set to form a first product and multiplying a respective vector datum from said second vector data set by a respective weighting factor from said second weighting factor set to form a second product; and
   summing said first and second products.

14. The method as defined in claim 13, further comprising the steps of:
   outputting a first control signal indicating a start point of said transition region;
   outputting a second control signal indicating a stop point of said transition region;
   applying a weighting factor of 1.0 to vector data derived from said first vector data set preceding said start point; and
   applying a weighting factor of 1.0 to vector data derived from said second vector data set subsequent to said stop point.

15. A method for ultrasound imaging of vector data derived from first and second firings along a scan line, comprising the steps of:
   transmitting first and second ultrasound beams along a predetermined scan line in succession;
   forming first and second vector data sets in response to echoes from said first and second ultrasound beams;
   compounding vector data from said first and second vector data sets by summing vector data of said first and second vector data sets and then scaling said summed vector data by a scaling factor; and
   displaying pixel data derived at least in part from said compounded vector data.

16. The method as defined in claim 15, wherein said scaling factor equals 1/n and n is the number of vector data sets being summed.

17. The method as defined in claim 15, wherein said scaling factor equals ½ when the number of vector data sets being summed is two and equals ¼ when the number of vector data sets being summed is three or four.

* * * * *